US011882116B2

(12) United States Patent
Quintero

(10) Patent No.: US 11,882,116 B2
(45) Date of Patent: Jan. 23, 2024

(54) METHOD AND SYSTEM FOR NEAR FIELD COMMUNICATION AUTHORIZATION SHARING

(71) Applicant: Synchronoss Technologies, Inc., Bridgewater, NJ (US)

(72) Inventor: César Augusto Muñoz Quintero, Dublin (IE)

(73) Assignee: Synchronoss Technologies, Inc, Bridgewater, NJ (US)

( * ) Notice: Subject to any disclaimer, the term of this patent is extended or adjusted under 35 U.S.C. 154(b) by 156 days.

(21) Appl. No.: 17/123,388

(22) Filed: Dec. 16, 2020

(65) Prior Publication Data

US 2022/0191187 A1 Jun. 16, 2022

(51) Int. Cl.
*H04L 29/06* (2006.01)
*H04L 9/40* (2022.01)
*H04W 12/069* (2021.01)
*H04L 67/14* (2022.01)

(52) U.S. Cl.
CPC ......... *H04L 63/0853* (2013.01); *H04L 63/08* (2013.01); *H04L 63/0807* (2013.01); *H04W 12/069* (2021.01); *H04L 67/14* (2013.01)

(58) Field of Classification Search
CPC ...... H06L 67/14; H04W 12/069; H04W 4/80; H04W 12/009; H04L 63/08; H04L 63/0853; G06F 21/604
See application file for complete search history.

(56) References Cited

U.S. PATENT DOCUMENTS

2018/0006818 A1\* 1/2018 Ren ..................... H04L 9/3213
2020/0104826 A1\* 4/2020 Rule .................... H04L 9/0625

FOREIGN PATENT DOCUMENTS

WO WO-2019200402 A1 \* 10/2019 ......... G06F 21/6245

\* cited by examiner

*Primary Examiner* — Tri M Tran
(74) *Attorney, Agent, or Firm* — Banner & Witcoff, Ltd.

(57) ABSTRACT

A computer implemented method and system for near field communication authentication sharing techniques is disclosed. The method comprises providing user credentials to access an application on a first device; sending a request to share the authentication with a second device; in response to the request, receiving an authentication code; and transmitting the authentication code to the second device, wherein sharing enables the second device to access the application on the second device without providing user credentials.

5 Claims, 3 Drawing Sheets

METHOD AND SYSTEM FOR NEAR FIELD COMMUNICATION AUTHORIZATION SHARING

BACKGROUND OF THE INVENTION

Field of the Invention

Embodiments of the present invention generally relate to cyber security, and more specifically to a method for NFC authorization sharing between devices.

Description of the Related Art

Today, each time a user accesses an application on a device, the user must authenticate himself. However, many users possess multiple devices, such as mobile phones, tablets, laptops, and the like, with same or similar applications on each device. Even when a user is logged into an application on, for example, a mobile phone, the user must reauthenticate himself to access the same application on a second device, such as a laptop. This is inefficient and produces a poor user experience.

Therefore, there is a need for a method for NFC authorization sharing between devices.

SUMMARY OF THE INVENTION

A system and/or method is provided for NFC authorization sharing between devices substantially as shown in and/or described in connection with at least one of the figures.

These and other features and advantages of the present disclosure may be appreciated from a review of the following detailed description of the present disclosure, along with the accompanying figures in which like reference numerals refer to like parts throughout.

Figure 1:
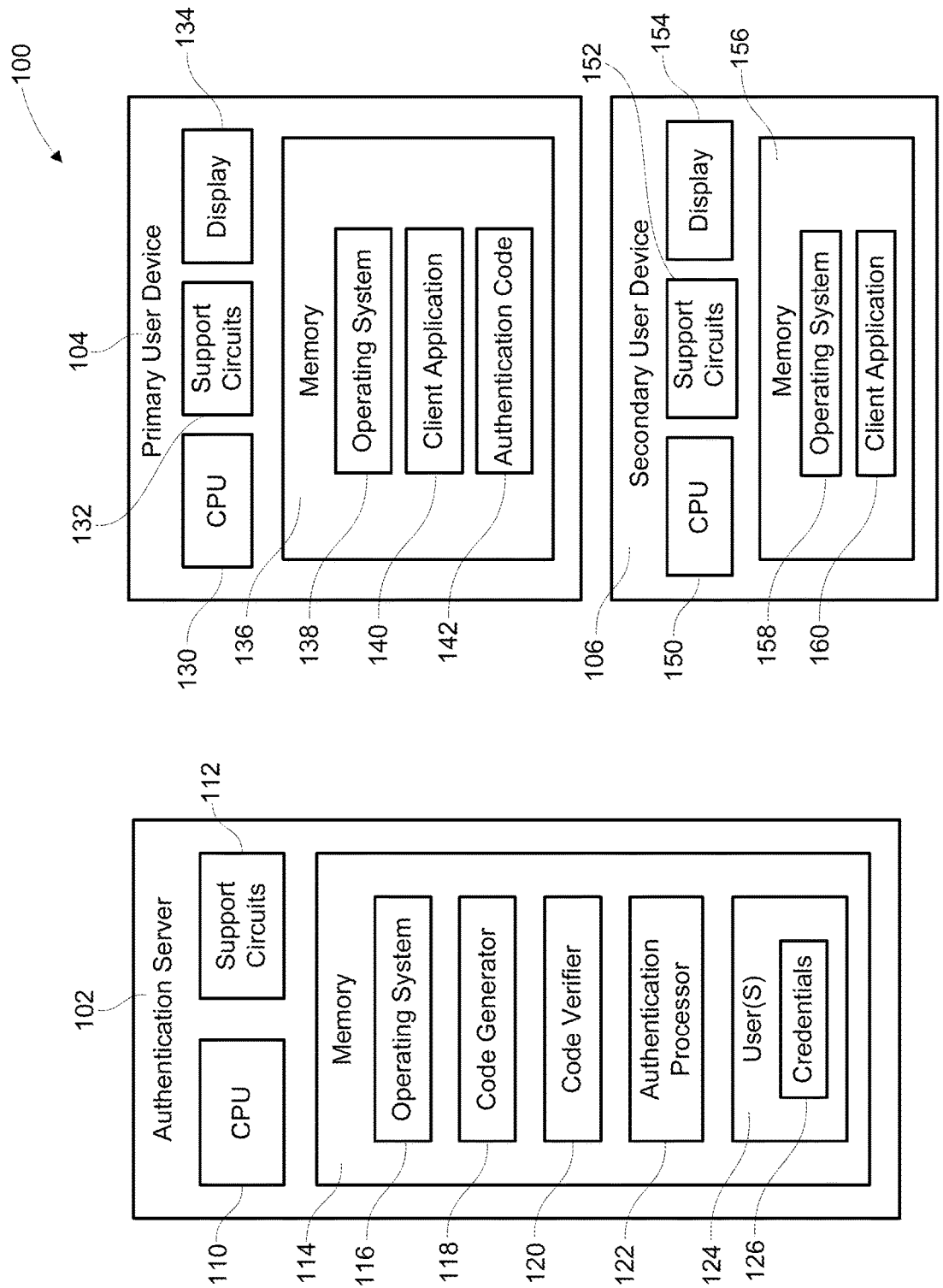
FIG. 1 depicts a block diagram of a system for NFC authorization sharing, according to one or more embodiments of the invention.

While the method and system for NFC authorization sharing is described herein by way of example for several embodiments and illustrative drawings, those skilled in the art will recognize that the method and system for NFC authorization sharing is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for NFC authorization sharing between devices defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for a system and method for NFC authorization sharing, according to embodiments of the invention. When a user verifies his identity by logging into an application on a first device, an authentication code is returned from an authentication server. Rather than providing credentials to access the same application on a second device, the user may then opt to share that authentication with the second device thereby allowing access to the application on the second device using the authentication provided on the first device.

When a user selects an option to share the authentication from his first device, a transmission is sent to the authentication server and a second authentication code is returned to the first device. The first device is then placed near the second device and the second authentication code is passed to the second device through near field communication (NFC), in the form of an NFC Data Exchange Format (NDEF) message. The second device transmits the second authentication code back to the authentication server, which exchanges the second authentication code for an access token. The access token allows the user to access the application on the second device without providing any user verification.

Various embodiments of a method and system for near field communication authentication sharing techniques are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for NFC authorization sharing between devices, according to one or more embodiments of the invention. The system 100 includes an authentication server 102, a primary user device 104 and a secondary user device 106.

The authentication server 102 may be in the cloud. Examples of the authentication server 102 include, but are not limited to a blade server, virtual machine, and the like. The authentication server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like. The memory 114 includes an operating system 116. The operating system 116 may include various commercially known operating systems. The memory 114 also includes a code generator 118, a code verifier 120, an authentication processor 122, and users 124, which are stored in a database, where authentication credentials 126 are stored for each user 124.

The primary user device 104 is a computing device, such as a desktop computer, laptop, tablet computer, smartphone, smartwatch or other wearable, smart speaker with a screen, and the like. The user device 104 includes a Central Processing Unit (CPU) 130, support circuits 132, a display 134, and a memory 136. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 includes at least one of Read Only Memory (ROM), Random Access Memory (RAM), disk drive storage, optical storage, removable storage and/or the like. The memory 136 includes an operating system 138, at least one client application 140, and one or more authentication codes 142 in a cache memory. The operating system 138 may include various commercially known operating systems. The at least one client application 140 may be a native application or an application downloaded from a digital distribution platform (not shown).

The secondary user device 106 is a computing device, such as a desktop computer, laptop, tablet computer, smartphone, smartwatch or other wearable, smart speaker with a screen, and the like. The secondary user device 106 includes a Central Processing Unit (CPU) 150, support circuits 152, a display 154, and a memory 156. The CPU 150 may include one or more commercially available microprocessors or microcontrollers that facilitate data processing and storage. The various support circuits 152 facilitate the operation of the CPU 150 and include one or more clock circuits, power supplies, cache, input/output circuits, and the like. The memory 156 includes at least one of Read Only Memory (ROM), Random Access Memory (RAM), disk drive storage, optical storage, removable storage and/or the like. The memory 156 includes an operating system 158, and at least one client application 160 on secondary user device 106 is the same client application as client application 160 on the primary user device 104. The operating system 158 may include various commercially known operating systems. The at least one client application 160 may be a native application or an application downloaded from a digital distribution platform (not shown).

When a user wants to work on client application 140 on multiple devices, for example, on a mobile device such as an Android phone and also, on a tablet, the user opens the client application 140 on primary user device 104. The user logs into the client application 140 using any of the verification credentials provided for on primary user device 104. For example, the user may have a login name and password for accessing client application 140. The user may have a biometric verification method set up, such as a fingerprint or a facial scan to access client application 140. The authentication processor 122 verifies the user using user credentials 126 from the database of users 124. If the verification process is successful, the code generator 118 generates a unique authentication code and sends the authentication code to the primary user device 104, where it is stored as authentication codes 142. The user then navigates within the client application 140 to a screen that allows him or her to "share" their session. The user may be prompted to confirm his or her desire to share and upon confirmation, the request to share is sent to the authentication server, where the code generator 118 generates a second authentication code, this code for the sharing of authentication with client application 140 on secondary user device 106. The second authentication code is stored in authentication codes 142.

The primary user device 104 and secondary user device 106 are placed near each other such that the second authentication code may be passed to the secondary user device 106. The authentication code may be passed through NFC in the form of an NDEF message. The secondary user device 106 sends the second authorization code to the authentication server 102. The code verifier 120 looks up the received authentication code received from the secondary user device 106. The code verifier 120 then exchanges the received authentication code for an access token and transmits it to the secondary user device 106.

The user is then able to access the client application 160 on the secondary user device 106 without the need to re-authenticate himself. When the user accesses client application 160 on the secondary user device 106, the access token is transmitted to the authentication server 102, where the code verifier 120 determines whether the access code is valid. If so, the user is able to access the client application 160 without providing user credentials. This process may then be repeated if the user wishes to access a second client application on both his primary and secondary user devices.

At any time after the authentication code is transmitted to the secondary user device 106, the user may access the client application 140 on the primary user device 104 and revoke authentication of the client application 160 on the secondary user device 106. A message is sent to the authentication server 102 to invalidate the access token associated with the client application 160, such that when access to the client application 160 on the secondary user device 106 is requested, access is denied.

Figure 2:
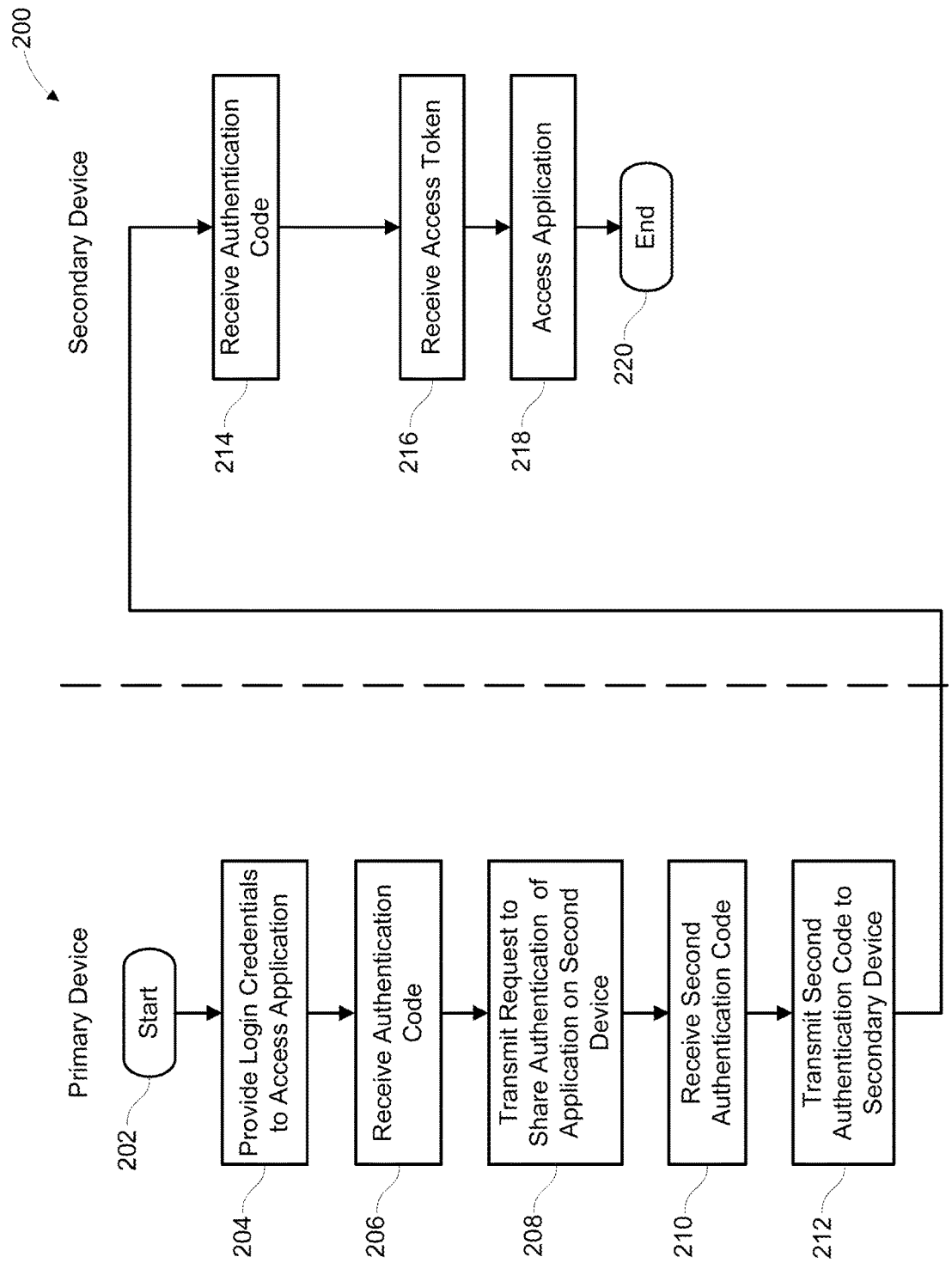
FIG. 2 depicts a flow diagram of a method for NFC authorization sharing, according to one or more embodiments of the invention.

FIG. 2 depicts a flow diagram of a method 200 for near field communication authentication sharing, according to one or more embodiments of the invention. The method 200 starts at step 202 and proceeds to step 204.

At step 204, a user logs into an application on a primary device of the user. The user logs into the application using any of the verification credentials set up to access the application. For example, the user may have a login name and password for accessing the application. The user may use biometric verification, such as a fingerprint or a facial scan previously established on the device to access the application. The application on the device transmits the user credentials to an authentication server.

At step 206, an authentication code is received. When the user is successfully verified based on stored user credentials from a user database, an authentication code is generated. The authentication code is a unique code that may be used at a later time. The authentication code is sent to the primary user device, where it is stored on the primary user device. If the user credentials do not match and the user cannot be verified, no authentication code is sent and the user is not allowed access to the application.

At step 208, a request to share access to the application is transmitted to the authentication server. In some embodiments, a prompt may be presented to confirm that the user indeed wishes to share the authentication.

At step 210, in response to the request to share the application, a second authentication code is received.

At step 212, the second authentication code is transmitted from the primary user device to the secondary user device. The primary user device and secondary user device are placed near each other such that the second authentication code may be passed to the secondary user device. The authentication code is passed through NFC in the form of an NDEF message.

At step 214, the secondary user device receives the authentication code from the primary user device.

At step 216, the secondary user device exchanges the authentication code for an access token. The secondary user device transmits the authorization code to the authentication server. In return, the secondary user device receives an access token that allows access to the application on the secondary user device.

At step 218, access is provided to the client application on the secondary user device. The access token allows access to the client application on the secondary user device, without the user needing to re-authenticate himself. At any time after the primary user device transmits the authentication code to the secondary user device, the user may opt to revoke authentication from primary user device. A message revoking the authentication is transmitted to the authentication server which invalidates the access token. When a user attempts to access the client application on the secondary user device, the access token is transmitted to the authentication server for verification and if the access token has been invalidated, access to the client application on the secondary user device is denied.

The method ends at step 220.

Figure 3:
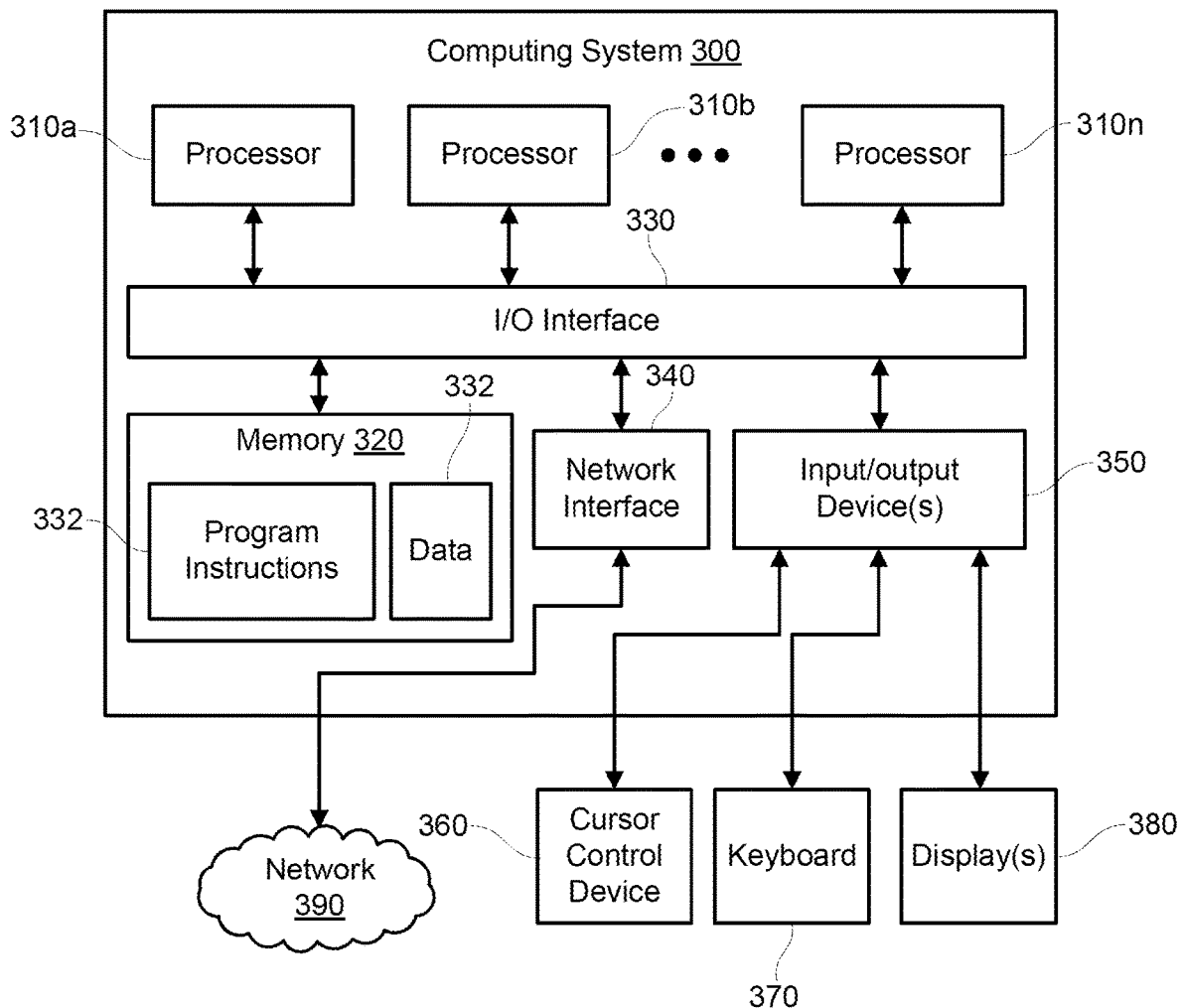
FIG. 3 depicts a computer system that can be utilized in various embodiments of the present invention to implement the computer and/or the display, according to one or more embodiments of the invention.

FIG. 3 depicts a computer system that can be used to implement the method of FIG. 2 in various embodiments of the present invention. Various embodiments of a method and system for NFC authorization sharing between devices, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement method 200, as processor-executable program instructions 322 (e.g., program instructions executable by processor(s) 310) in various embodiments.

In the illustrated embodiment, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of components may be utilized by the system to receive user input described above. In various embodiments, a user interface (e.g., user interface 330) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/flash-type memory, persistent storage (magnetic or solid state), or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the system, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touch pads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the method illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A system for near field communication authorization sharing between devices comprises:
   a first user device comprising:
      a) at least one processor;
      b) at least one input device; and c) at least one storage device storing processor-executable instructions which, when executed by the at least one processor, perform a method including:
providing user credentials as authentication to access an application on a first device, wherein the user credentials comprise a biometric verification;
sending a request to share the authentication with a second device;
in response to the request, receiving an authentication code; and sharing the authentication code with the second device by transmitting the authentication code to the second device using the near field communication data exchange format, wherein sharing enables the second device to access the application on the second device without authentication;
a second user device comprising:
a) at least one processor;
b) at least one input device; and
c) at least one storage device storing processor-executable instructions which, when executed by the at least one processor, perform a method including:
receiving an authentication code from the first user device;
requesting access to the application on the second device;
transmitting the authentication code to an authentication server;
in response to transmitting the authentication code, receiving an access token; and accessing the application using the second device; and
an authentication server comprising:
a) at least one processor;
b) at least one input device; and
c) at least one storage device storing processor-executable instructions which, when executed by the at least one processor, perform a method including:
verifying user credentials for an application on a first user device;
transmitting to the first user device, an authentication code;
receiving the authentication code from the second user device; and
providing an access token to the second device to facilitate access to the application on the second device;
wherein at any time after the first user device transmits the authentication code to the second user device, the method comprises:
sending a revocation message from the first user device to the authentication server invalidating the access token; and
denying access to the application on the second user device.

2. The system of claim 1, wherein the first device is an Android device.

3. The system of claim 1, wherein the second device is an Android device.

4. The system of claim 1, wherein the authentication code is transmitted from the primary user device to the second user device through near field communication.

5. The system of claim 1, wherein the application on the first device is the same application on the second device.

* * * * *